US008522909B2

(12) United States Patent
Niina

(10) Patent No.: US 8,522,909 B2
(45) Date of Patent: Sep. 3, 2013

(54) ATTACHMENT STRUCTURE OF ELECTROMOTOR OF HYBRID VEHICLE

(75) Inventor: Yuzo Niina, Anjo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 169 days.

(21) Appl. No.: 12/959,076

(22) Filed: Dec. 2, 2010

(65) Prior Publication Data
US 2011/0132672 A1    Jun. 9, 2011

(30) Foreign Application Priority Data

Dec. 3, 2009    (JP) .............................. P2009-275770

(51) Int. Cl.
B60K 1/00    (2006.01)
(52) U.S. Cl.
USPC ........ 180/299; 180/65.31; 180/291; 180/298; 180/311; 280/124.109; 280/788; 280/830; 296/203.04
(58) Field of Classification Search
USPC .......................................................... 180/299
See application file for complete search history.

(56) References Cited

U.S. PATENT DOCUMENTS

| 5,366,151 | A | * | 11/1994 | King et al. | ..................... 237/2 A |
| 5,405,167 | A | * | 4/1995 | Lee | ................................ 280/830 |
| 7,588,117 | B2 | * | 9/2009 | Fukuda | ........................ 180/291 |
| 7,614,473 | B2 | * | 11/2009 | Ono et al. | ..................... 180/299 |

FOREIGN PATENT DOCUMENTS

| JP | 11-165516 | A | 6/1999 |
| JP | 11165516 | * | 6/1999 |

OTHER PUBLICATIONS

Chinese Office Action issued in Chinese Patent Application No. 201010585073.3 on Mar. 8, 2013.

* cited by examiner

Primary Examiner — John R Olszewski
Assistant Examiner — Hilary L Johns
(74) Attorney, Agent, or Firm — Birch, Stewart, Kolasch & Birch, LLP

(57) ABSTRACT

An attachment structure of an electromotor, connected to rear wheels, of a vehicle, includes: a sub frame, to which the electromotor is assembled, provided at a rear portion of the vehicle, and having members extending in a longitudinal direction, and front and rear cross members extending in a width direction of the vehicle, the sub frame having a rectangular shape in a direction perpendicular to the longitudinal and width directions; a receptacle provided at a front of the sub frame; and a rear motor mount provided at a rear of the rear cross member, a position of the rear motor mount being substantially the same as that of the electromotor in the perpendicular direction, the electromotor being provided at an upper side of the rear cross member; and a connection member, to which the electromotor is fixed, being provided at a lower side of the front cross member.

5 Claims, 5 Drawing Sheets

ATTACHMENT STRUCTURE OF ELECTROMOTOR OF HYBRID VEHICLE

BACKGROUND OF THE INVENTION

1. Field of the Invention

The invention relates to an attachment structure of an electromotor connected to rear wheels of a hybrid vehicle.

2. Description of the Related Art

There is a hybrid vehicle based on an FF vehicle (Front Engine, Front Drive vehicle) in which an electromotor is connected to rear wheels thereof and driving is enabled by an engine and the electromotor. In the FF vehicle, there is a structure in which a fuel tank is disposed below a rear seat to secure a large interior space or accommodating space. In the meantime, regarding an example in which the electromotor is connected to the rear wheels, there is a structure in which an electromotor is provided adjacent to rear wheels to simplify the structure and to improve transmission efficiency (for example, see JP-A-11-165516).

Due to this, for a hybrid vehicle based on the FF vehicle in which the electromotor is connected to the rear wheels, a structure is considered in which a fuel tank is arranged just in front of the electromotor.

However, according to the hybrid vehicle having the above structure, when the vehicle is collided from the rear (hereinafter, referred to as rear collision), the electromotor may be pushed forward by the rear collision, thereby damaging the fuel tank.

SUMMARY OF THE INVENTION

It is therefore an object of the invention to provide an attachment structure of an electromotor capable of preventing a fuel tank from being damaged even when the electromotor is pushed out at the time of rear collision in a vehicle having an electromotor arranged at a rear portion of the vehicle.

In order to achieve the object, according to the invention, there is provided an attachment structure of an electromotor of a vehicle, the electromotor which is connected to rear wheels, the attachment structure comprising: a sub frame provided at a rear portion of the hybrid vehicle, and including at least two first members which extend in a first direction that is a longitudinal direction of the vehicle and at least two second members which extend in a second direction that is a width direction of the vehicle and which include a front member and a rear member, the sub frame having a substantially rectangular shape in a third direction perpendicular to the first direction and the second direction, the sub frame to which the electromotor is assembled, a receptacle being provided at a front side of the sub frame; a rear motor mount provided at a rear side of the rear member, a position of the rear motor mount being substantially the same as a position of the electromotor in the third direction, the electromotor being provided at an upper side of the rear member; and a connection member provided at a lower side of the front member, the connection member to which the electromotor is fixed.

The vehicle may include an internal combustion engine, and the receptacle may be a fuel tank that stores liquid fuel of the internal combustion engine.

The connection member may include a mount part and an attachment part that is connected to the mount part, the front member may include a bracket at a lower side thereof, the mount part may be attached to the bracket, and the attachment part may be attached to the electromotor.

DETAILED DESCRIPTION OF THE INVENTION

An illustrative embodiment of an attachment structure of an electromotor in a hybrid vehicle of the invention will be described.

Figure 5:
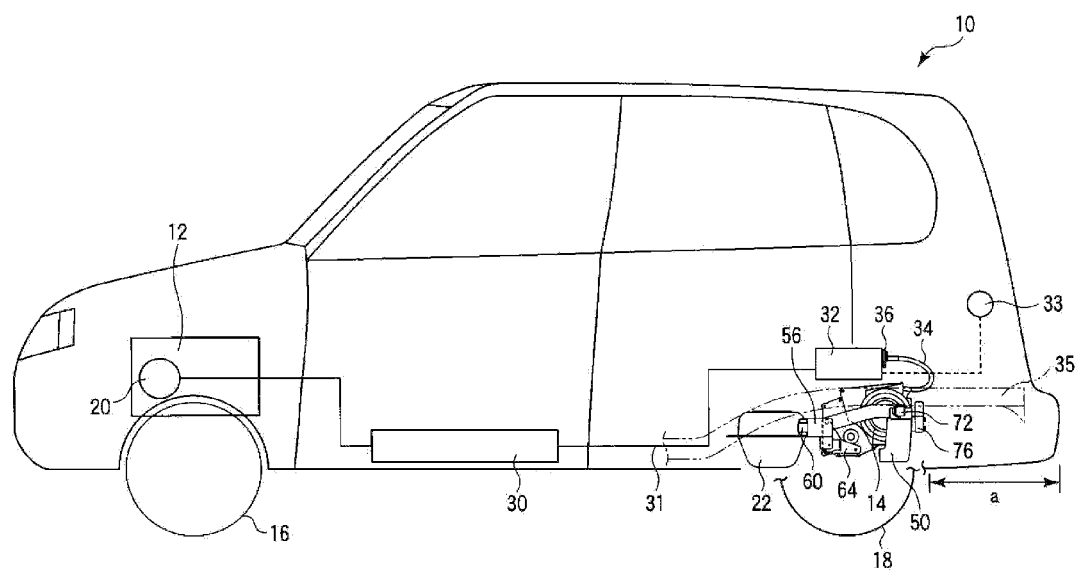
FIG. 5 is a structural view showing an illustrative embodiment of a vehicle having assembled a rear-wheel electromotor thereto.

FIG. 5 shows a vehicle 10 that is an example of the hybrid vehicle. The vehicle 10 includes an engine 12 at the front portion, and a rear-wheel electromotor 14 for driving and a fuel tank 22 at the rear portion. Hereinafter, a driving direction of the vehicle 10 is referred to as the front and the opposite direction to the driving direction is referred to as the rear. Based on this, the right and the left are determined. In addition, the gravity direction is referred to as the lower and the opposite direction to the gravity direction is referred to as the upper.

The vehicle 10 includes front wheels 16 at right and left sides of the front portion, and rear wheels 18 at right and left sides of the rear portion. The engine 12 is an internal combustion engine that uses gasoline as fuel and is mounted between the front wheels 16. The engine 12 includes a transmission, a differential device and the like assembled thereto, which are not shown, and a rotational output of the engine 12 is transmitted to the front wheels 16 through the transmission, the differential device and the like.

The vehicle 10 includes an ECU (Electronic Control Unit), which is not shown. The ECU obtains a variety of information such as operating states of accelerator and brake pedals, which are not shown, vehicle speed and a charged state of a battery 30, which will be described later, and arbitrarily controls the engine 12, the transmission and the like based on the information. In the meantime, it should be noted that the engine 12 is not limited to the gasoline engine.

A generator 20 is provided at a side of the engine 12. The generator 20 generates power by rotational forces input from the engine 12 or front wheels 16. The battery 30 is provided at a central part in the underfloor space. The battery 30 is a battery that drives the vehicle 10 and has a relatively high capacity. The power generated in the generator 20 is stored in the battery 30. In the meantime, it may be possible that the generator 20 is driven by power from the battery 30 to rotate the front wheels 16 or to start the engine 12. The vehicle 10 includes at the rear portion a sub frame 50 including the rear-wheel electromotor 14 assembled thereto.

Next, the sub frame 50 will be described.

Figure 2:
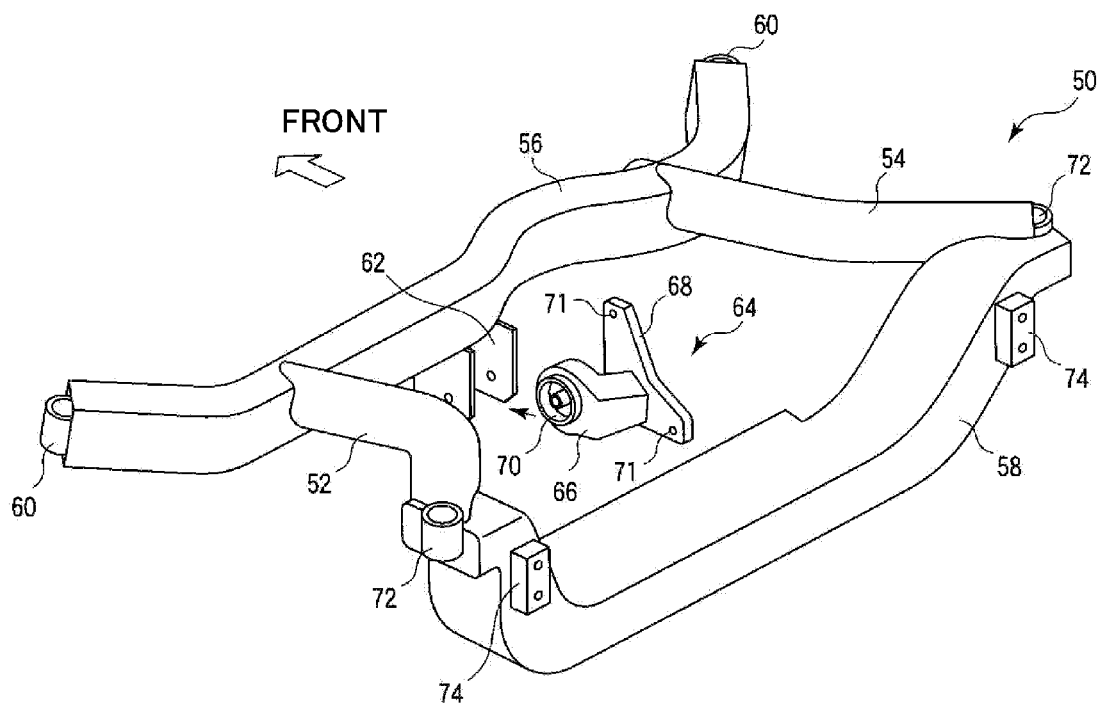
FIG. 2 is a perspective view showing an illustrative embodiment of a sub frame.

FIG. 2 shows the sub frame 50. As shown in FIG. 2, the sub frame 50 has a substantially rectangular shape and includes tubular members 52 and 54, which are main pipes provided at both sides of the vehicle 10, a front cross member 56 provided at the front portions of the tubular members 52 and 54, and a rear cross member 58 (a rear left-right extending member) provided at the rear portions of the tubular members 52 and 54.

The front cross member 56 is a member having a rectangular section and is provided in a width direction (right-left direction) of the vehicle 10. End portions of the tubular members 52 and 54 are fixed to the front cross member 56 at an interval. In addition, the front cross member 56 is formed with fixing parts 60 at the both end portions thereof. The fixing parts 60 are fixed to a chassis frame 35, which is shown in FIG. 5, of the vehicle 10.

Further, the front cross member 56 is provided with a front motor mount bracket 62 at the approximate center thereof. The front motor mount bracket 62 has a substantially U shape and extends toward the lower side of the front cross member 56. A front motor mount 64 is attached to the inner portion of the front motor mount bracket 62.

Figure 3:
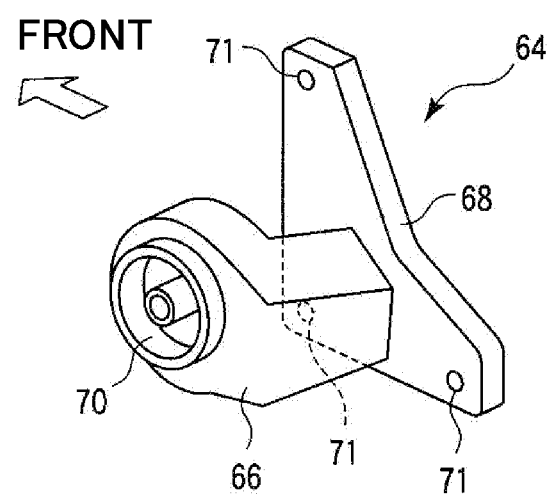
FIG. 3 is a perspective view showing an illustrative embodiment of a front motor mount.

FIG. 3 shows the front motor mount 64. As shown in FIG. 3, the front motor mount 64 includes a base 66 and an attachment piece 68 that is provided on the base 66. The base 66 is formed with amount part 70 that is attached to the front motor mount bracket 62. The attachment piece 68 is a plate member having a substantially triangular shape and has attachment holes 71 formed at three corner portions thereof.

The tubular members 52 and 54 each of which has a tubular shape are respectively formed into a substantially symmetrical shape with respect to a longitudinal direction (front-rear direction) of the vehicle 10. The tubular members 52 and 54 extend rearward from the front cross member 56 with being substantially flush with the front cross member 56 and are bent at the vicinities of the centers thereof so that the tubular members 52 and 54 are opened outwardly. Rear end portions of the tubular members 52 and 54 are respectively connected to the right and left end portions of the rear cross member 58.

Fixing parts 72 are provided at connection portions between the tubular members 52 and 54 and the rear cross member 58. The fixing parts 72 are fixed to the chassis frame 35, which is shown in FIG. 5, of the vehicle 10.

Figure 1:
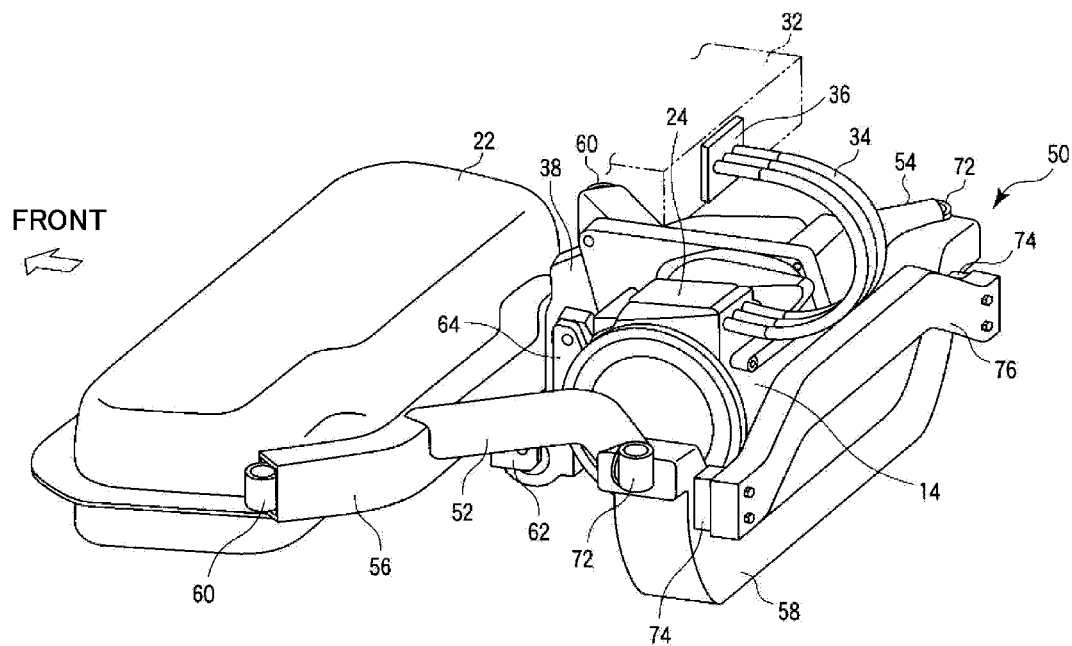
FIG. 1 is a perspective view showing an assembly structure of an electromotor according to an illustrative embodiment of the invention.

The rear cross member 58 is a member having a rectangular section, and has both end portions that are bent upwardly. The both end portions of the rear cross member 58 are connected to the tubular members 52 and 54. A central part of the rear cross member 58 is slightly protruded forward. Attachment parts 74 are provided on rear faces of the both end portions of the rear cross member 58. As shown in FIG. 1, a rear motor mount 76 that is a structure member is fixed to the attachment parts 74 with screws.

FIG. 1 shows a state in which the rear-wheel electromotor 14 is assembled inside the sub frame 50. The rear-wheel electromotor 14 has a cylindrical shape and is assembled with a direction of an output shaft, which is not shown, thereof being parallel with the width direction of the vehicle 10.

The rear-wheel electromotor 14 includes a terminal connection part 24 at the upper portion thereof. The terminal connection part 24 is a connection port including a predetermined number of connection terminals, which are not shown, and is disposed at the front side of a rear wall of the rear motor mount 76. The terminal connection part 24 is connected with one end of a power line 34. The power line 34 has a diameter of about 1 cm and is thick enough to enable predetermined current to flow therein. The other end of the power line 34 is connected to a power control unit 32 that will be described below. The power line 34 connected to the terminal connection part 24 is upwardly bent from the terminal connection part 24 and is connected to a connection port 36 of the power control unit 32. The connection port 36 is disposed at the front side of the rear wall of the rear motor mount 76, in the same manner as the terminal connection part 24 of the rear-wheel electromotor 14.

A decelerating differential device 38 is provided at an output shaft section of the rear-wheel electromotor 14. The decelerating differential device 38 includes a decelerating gear and a differential gear therein, and right and left rear wheel driving shafts, which are not shown, are connected to an output end portion of the differential gear. The rear wheel driving shafts are respectively connected to the rear wheels 18 and transmit rotational output of the rear-wheel electromotor 14 to the right and left rear wheels 18 while performing the differential motion. In the meantime, the decelerating differential device 38 may have an accelerating gear therein, rather than the decelerating gear.

Figure 4:
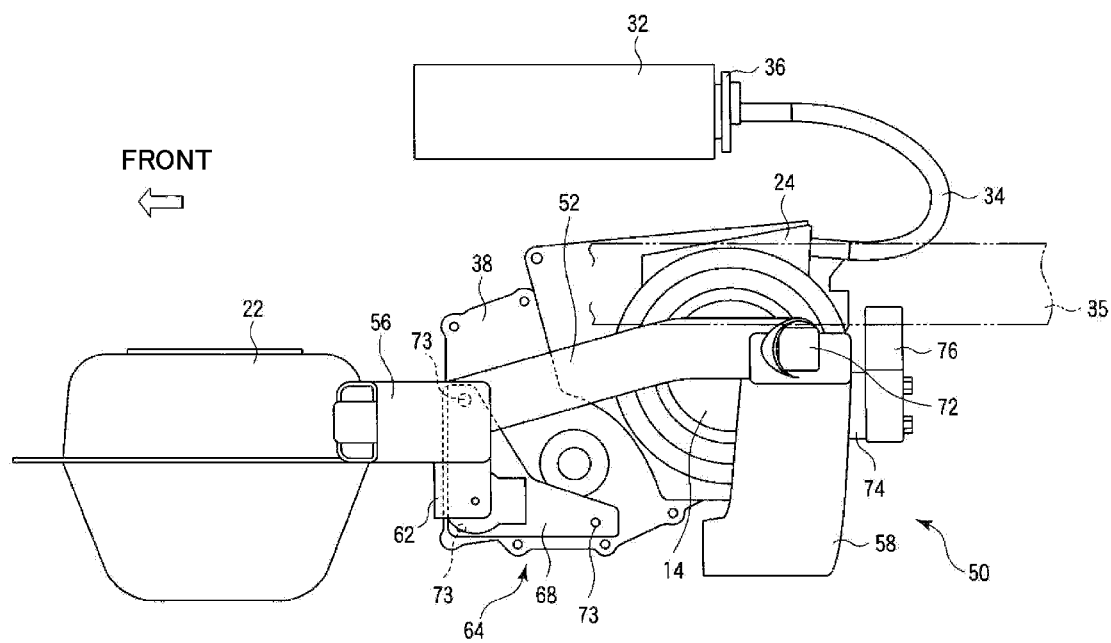
FIG. 4 is a side view showing the assembly structure of the electromotor according to an illustrative embodiment shown in FIG. 1.

The decelerating differential device 38 includes an attachment hole, which is not shown, at a side face thereof, and the attachment piece 68 of the front motor mount 64 is fixed to the decelerating differential device 38 with a screw 73 through the attachment hole, as shown in FIG. 4. The rear-wheel electromotor 14 is thus attached to the front cross member 56.

The rear-wheel electromotor 14 is attached in such a way that a center of rotation of the rear-wheel electromotor 14 is substantially flush with the rear cross member 58. Namely, height of the center of the rotation of the rear-wheel electromotor 14 is substantially the same as height of the rear cross member 58. The fuel tank 22 is provided at the front side of the front cross member 56. The fuel tank 22 is a tank that stores liquid fuel of the engine 12. The fuel tank 22 is provided at a position that is below the floor face of the vehicle 10 and is substantially flush with the front cross member 56.

The rear cross member 58 extends at the lower side of the rear-wheel electromotor 14 at a slight interval with the rear-wheel electromotor 14. In addition, the rear motor mount 76 extends at the rear side of the rear-wheel electromotor 14 at a slight interval with the rear-wheel electromotor 14.

The power control unit 32 is provided above the rear-wheel electromotor 14. The power control unit 32 is attached to the chassis frame 35 by a stay and the like and controls the charge and discharge of the battery 30 and an operation of the rear-wheel electromotor 14 in response to instructions from the ECU.

The power control unit 32 includes the connection port 36 and is connected with the power line 34. The power control unit 32 is connected to the rear-wheel electromotor 14 through the power line 34. The power control unit 32 is also connected to the battery 30 through a power line 31.

An external power supply connection port 33 is provided at, for example, a rear side face of the vehicle 10. The external power supply connection port 33 is a connection port to which an external power supply is connected. The battery 30 is charged using the external power supply that is connected to the external power supply connection port 33.

Next, operational effects of the attachment structure of the electromotor of the hybrid vehicle will be described.

When the engine 12 is operated and power is thus transmitted to the front wheels 16, the vehicle 10 drives in a front-wheel driving manner. In addition, when the power is supplied to the rear-wheel electromotor 14 from the power control unit 32, the driving force of the rear-wheel electromotor 14 is transmitted to the rear wheels 18 through the decelerating differential device 38, and the vehicle 10 drives in a rear-wheel driving manner. The driving of the vehicle 10 may drive in the front-wheel driving manner, the rear-wheel driving manner, or an all-wheel driving manner in which all of the front and rear wheels drive at the same time. The rear wheels 18 are supported by the suspension provided at the sub frame 50 and arbitrarily operate in the upper and lower directions.

When the vehicle 10 is collided from the rear side, the impact force due to the rear collision is absorbed while breaking a crushable zone a, which is shown in FIG. 5, of the rear portion of the vehicle 10. when the impact force is within a predetermined range, the vehicle is broken only within the crushable zone a, and the portion of the vehicle which is arranged at the front side of the rear motor mount 76 is little damaged.

However, when the impact force is high and is thus applied to the rear motor mount 76, the rear motor mount 76 is deformed in the forward direction. When the impact is absorbed as the rear motor mount 76 is deformed, the rear-wheel electromotor 14 is not damaged.

When the impact is higher and thus the rear motor mount 76 is highly displaced forward while deforming the sub frame 50, the rear motor mount 76 pushes the rear-wheel electromotor 14. Hence, the front motor mount bracket 62 is damaged and the rear-wheel electromotor 14 is moved forward. However, the rear-wheel electromotor 14 is hindered from moving forward while contacting the front cross member 56 and is moved obliquely downward so that the rear-wheel electromotor 14 moves below the front cross member 56.

Thereby, even when the high impact is applied, the rear-wheel electromotor 14 is moved obliquely downward. Thus, the damage of the fuel tank 22 due to the contact of the rear-wheel electromotor 14 is not caused.

In addition, the rear cross member 58 is provided below the rear-wheel electromotor 14. Accordingly, even when the front motor mount bracket 62 is broken, the rear-wheel electromotor 14 is put on the rear cross member 58 and is not dropped on the road from the vehicle 10.

In the above exemplary embodiment, the fuel tank 22 is arranged at the front side of the rear-wheel electromotor 14. However, the invention is not limited to the fuel tank 22 and the other member may be also possible. For example, expensive and important parts such as battery, fuel cell and inverter may be arranged at the front side of the rear-wheel electromotor 14.

According to an aspect of the invention, the attachment structure of the electromotor of the hybrid vehicle is configured as follows.

The hybrid vehicle has such a structure that an electromotor is connected to rear wheels of an FF vehicle (Front Engine, Front Drive vehicle). The vehicle has a sub frame having a substantially rectangular shape at the rear portion thereof. For example, the sub frame is formed into the rectangular shape by arranging members, which extend in a longitudinal direction (front-rear direction), at right and left sides and attaching a front cross member and a rear cross member at front and rear parts of the members, respectively. The sub frame may have a suspension assembled at the rear portion of the vehicle and may hold the rear wheels through the suspension so that the rear wheels can move vertically. In addition, a rear motor mount, which is a structure member, is attached to the rear side of the sub frame.

The electromotor is attached at an inside of the sub frame, i.e., a space surrounded by the above described members which arranged at the right and left sides and which extend in the front-rear direction, the front cross member, the rear cross member and the rear motor mount.

To be more specific, the electromotor is attached as follows. A bracket, which is a front motor mount bracket, to which a connection member, which is a front motor mount, is attached, is provided at the front cross member. The front motor mount includes amount part at the front portion thereof and an attachment part at the rear portion thereof which is integrally formed with the mount part. The mount part of the front motor mount is attached to the bracket, and the attachment part is attached to the electromotor. Thereby, the electromotor is fixed to the sub frame.

In addition, the rear cross member is disposed below the electromotor at a slight interval with the electromotor. The rear motor mount is provided at the rear side of the electromotor at a slight interval with the electromotor. Both end portions of the rear motor mount are attached to right and left end portions of the rear cross member. Furthermore, the electromotor is attached to the sub frame at a position that is slightly higher than a center of the mount part of the front motor mount. A fuel tank is disposed at the front side of the front cross member at a position that is substantially the same in height as a position of the front cross member, at a slight interval with the front cross member.

The attachment structure of the electromotor of the invention has following effects. Since the electromotor is provided adjacent to the rear wheels, it is possible to drive the vehicle while effectively driving the rear wheels. When the vehicle is collided from the rear side, the rear motor mount receives the impact by the rear collision. Since there is a gap between the rear motor mount and the electromotor, the electromotor is not damaged.

When the energy of the rear collision is high and thus the rear motor mount or rear cross member is deformed, the electromotor is pushed forward and the front cross mount is thus damaged. However, the electromotor is hindered from moving by the front cross member provided at the front side of the electromotor, so that the electromotor is pushed out obliquely downward.

Thereby, even when the electromotor is pushed from the rear side, the electromotor moves without contacting the fuel tank. Accordingly, it is possible to prevent the fuel tank from being damaged due to the electromotor. In addition, even when the front motor mount is damaged, the electromotor is put on the rear cross member and is prevented from being completely detached from the vehicle.

The present invention can be applied to an electric vehicle or hybrid vehicle having an electromotor connected to rear wheels.

What is claimed is:

1. An attachment structure of an electromotor of a vehicle, the electromotor which is connected to rear wheels, the attachment structure comprising:
   a sub frame, to which the electromotor is assembled, provided at a rear portion of the vehicle, and having at least two first members extending in a longitudinal direction of the vehicle and a front cross member and a rear cross member extending in a width direction of the vehicle, the sub frame having a substantially rectangular shape in a direction perpendicular to the longitudinal and width directions;
   a receptacle being provided at a front side of the sub frame;
   a rear motor mount provided at a rear of the rear cross member, a position of the rear motor mount being substantially the same as a position of the electromotor in the perpendicular direction, and the electromotor being provided at an upper side of the rear cross member; and
   a connection member, to which the electromotor is fixed, provided at a lower side of the front cross member, the electromotor being fixed to the connection member at a position lower than a position where the rear motor mount opposes the electromotor.

2. The attachment structure according to claim 1, wherein
the vehicle includes an internal combustion engine, and
the receptacle is a fuel tank that stores liquid fuel of the internal combustion engine.

3. The attachment structure according to claim 1, wherein
the connection member includes a mount part and an attachment part that is connected to the mount part,
the front cross member includes a bracket at a lower side thereof,
the mount part is attached to the bracket, and
the attachment part is attached to the electromotor.

4. The attachment structure according to claim 1, wherein
the rear cross member extends below the electromotor to prevent the motor from dropping to a road surface upon the rear-end collision.

5. The attachment structure according to claim 1, wherein
the electromotor is fixed to the connection member at the position lower than the position where the rear motor mount opposes the electromotor, such that the electromotor moves obliquely downward under the front cross member upon a rear-end collision.

* * * * *